June 21, 1927.
B. F. SEYMOUR
1,633,133
COMBINED RESILIENT TRANSMISSION AND BEARING
Filed Dec. 13, 1924
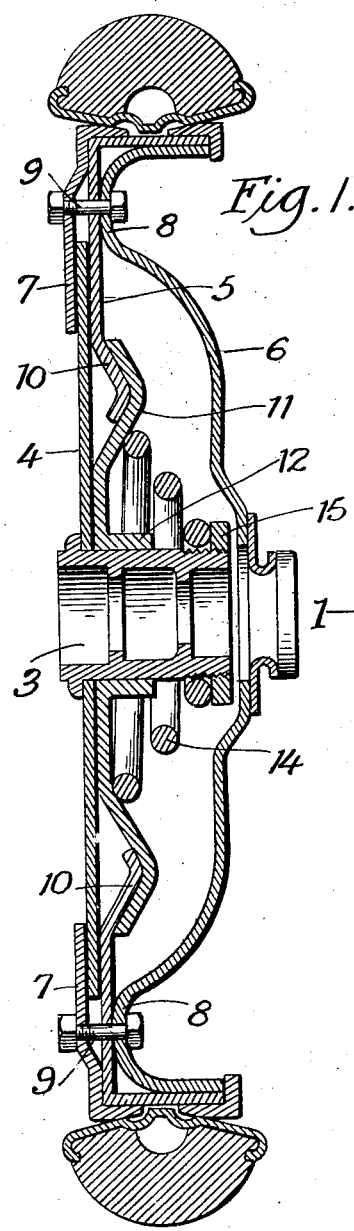
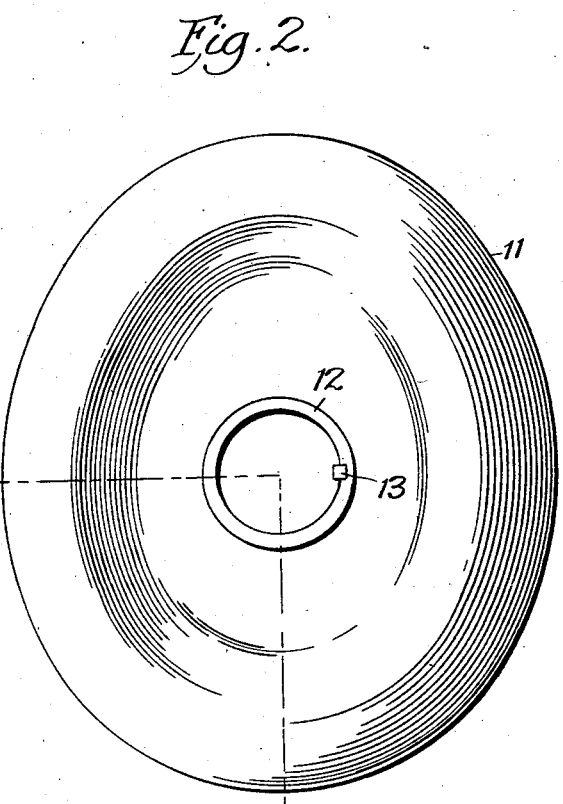
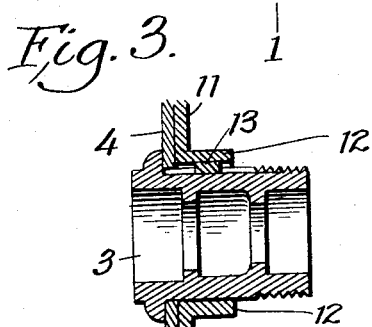
Inventor
Benjamin F. Seymour
By
Attorney Patented June 21, 1927.

1,633,133

UNITED STATES PATENT OFFICE.

BENJAMIN F. SEYMOUR, OF WASHINGTON, DISTRICT OF COLUMBIA.

COMBINED RESILIENT TRANSMISSION AND BEARING.

Application filed December 13, 1924. Serial No. 755,736.

The present invention relates to resilient transmissions and bearings, more particularly for vehicle wheels, and consists in the combinations and arrangements of elements hereinafter described and particularly set forth in the accompanying claims.

The purpose of the invention is to provide a flexible or resilient transmission between a driving and a driven element adapted to positively transmit the driving force whether said elements are in or out of concentric relation; and one which will readily accommodate itself under all normal working conditions to which said elements may be subjected.

A further purpose of the invention is to provide a combined resilient transmission and bearing for a vehicle wheel to the end that such a wheel may possess the desired resilient qualities and also give the necessary transmission medium between the wheel proper and the motive power of the vehicle.

The construction shown herein is proposed as an improvement or other embodiment of the types of combined resilient transmission and bearing disclosed in my copending applications for United States patents bearing the Serial Numbers 537,251, filed Feb. 17, 1922; 664,632, filed Sept. 24, 1923; and patents numbered 1,462,385, July 17, 1923; 1,462,386, July 17, 1923; 1,477,908, Dec. 18, 1923; 1,477,909, Dec. 18, 1923; 1,477,910, Dec. 18, 1923; 1,474,122, Nov. 13, 1923; 1,477,911, Dec. 18, 1923; 1,477,912, Dec. 18, 1923; 1,476,187, Dec. 4, 1923; 1,525,327, Feb. 3, 1925; 1,540,189, June 2, 1925.

The construction shown herein is characterized in that the wheel rim is normally supported concentrically on the wheel hub by a pair of cone and sleeve elements of substantially elliptical design, and said elements are cooperable to effect the necessary resiliency to the wheel as a whole, and for driving the wheel rim through turning of the hub.

The present invention further embodies a combined shock absorber, snubber, resilient transmission and resilient suspension elements all co-operable and interdependent in a unitary structure and adapted for general application in the art.

The invention is disclosed by way of illustration in the accompanying drawings wherein:

Figure 1 is a transverse sectional view taken through the wheel, in the direction indicated by the line 1—1 of Figure 2;

Figure 2 is a front elevational view of the hub elliptical member; and

Figure 3 is a detailed sectional view of the hub per se.

Referring to the construction in further detail, and wherein like reference characters designate corresponding parts, the construction consists of a hub portion 3 having a fixed and disk-like side plate 4 located adjacent the vehicle body (not shown) and 5 and 6 designate, respectively, the inner and outer side plates of the wheel rim adapted to have limited angular and radial movements relative to the wheel hub.

The wheel rim plate 5 is disposed in bearing relation against the hub plate 4, and an annular retaining plate 7 is disposed against the outer marginal edge portion of said side plate 4 and is secured to the wheel rim portion 8 by a suitable number of bolts 9. Said rim portion 8 is annularly disposed against the rim portion 5 to the end of obtaining maximum rigidity of the wheel structure.

The resilient transmission and bearing device per se consists of a male cone element 10, of elliptical design, formed on the inner portion of the rim side plate 5, and said cone element is normally coaxial with respect to the wheel hub. A similar and elliptical shaped female shaped cone element 11 mounted on the wheel hub co-acts with said rim cone element 10 in a manner to be explained.

The cone element 11 is adapted to have lateral movement through the radial and angular movements imparted to the wheel rim as characteristic of the corresponding elements disclosed in my patents and co-pending applications above referred to.

The cone element 11 is constructed with an inner and integral hub portion 12 that is splined on the hub member 3, as at 13, to the end that said cone element 11 may have limited sliding movement relative to the wheel hub incident to the limited radial or angular movement imparted to the wheel rim.

The hub cone element 11 is held in co-operable relation with the rim cone element 10 by the spring 14 and through the tension of this spring said cone elements (10 and 11) are held in proper contact. An adjustable collar 15 screw threaded on the hub portion 3 serves for regulating the tension of said spring.

It will therefore be seen from the foregoing that any motion or shock encountered by the wheel rim will be absorbed in the direction of the axis of the wheel through the co-operable and elliptical cone elements, and this absorption of the shock will be highly flexible or resilient in nature. Whenever forward or reverse motion is imparted to the wheel hub the co-operable cone and elliptical elements will through friction impart turning to the wheel rim with appreciably little or no lost motion, and such transmission will be gradual and resilient.

It will be clear from the foregoing that the construction disclosed and principle of operation thereof adapt the invention to be used as a coupling device or clutch, and it is to be understood here that the invention is not limited to the details of construction shown and described, as these may be varied widely without departing from the spirit of the invention as defined by the claims.

What is claimed as new is:

1. In a combined resilient transmission and bearing for vehicle wheels, the combination of a hub portion, a wheel rim mounted to have limited relative movement thereon, and elliptically shaped cone elements arranged co-operable therewith.

2. In a combined resilient transmission and bearing for vehicle wheels, the combination of a hub portion, a wheel rim mounted to have limited relative movement thereon and cooperable, elliptically shaped male and female cone elements interposed between the rim and the wheel hub portion, said cone elements being coaxially arranged with the hub axis, and one of said elements being slidably connected with the hub portion in axial direction thereof.

3. In a combined resilient transmission and bearing for vehicle wheels, the combination of a hub portion, a wheel rim mounted to have limited relative movement thereon, a male cone element of elliptical design carried rigidly by the wheel rim, a co-operable female cone element of elliptical design splined on the hub portion, to permit movement in axial direction thereof, and a spring maintaining said cone elements in co-operable relation said cone elements being coaxially arranged with the hub axis.

4. In a resilient transmission and bearing for vehicle wheels, the combination of male and female driven and driving elliptical members, said driven member constructed to support a wheel rim, the hub portion of the driving member being mounted concentrically thereto, and resilient means holding said members in assembled relation.

5. In a shock absorbing and snubbing device the combination of male and female members provided with elliptical elements, and resilient means sustaining said members in co-active relation.

In witness whereof, I have hereunto set my hand at Philadelphia, Pa., this 26th day of November, A. D. nineteen hundred and twenty-four.

BENJAMIN F. SEYMOUR.